Dec. 1, 1925.

A. E. WALLER

RESISTANCE DEVICE AND WELDING WIRE

Filed July 6, 1921

Inventor
Alfred E. Waller
By his Attorneys
Edwards, Sager + Bower.

Patented Dec. 1, 1925.

1,563,812

UNITED STATES PATENT OFFICE.

ALFRED ERNEST WALLER, OF BRONXVILLE, NEW YORK, ASSIGNOR TO WARD LEONARD ELECTRIC COMPANY, A CORPORATION OF NEW YORK.

RESISTANCE DEVICE AND WELDING WIRE.

Application filed July 6, 1921. Serial No. 482,721.

*To all whom it may concern:*

Be it known that I, ALFRED ERNEST WALLER, a citizen of the United States, residing at Bronxville, in the county of Westchester and State of New York, have invented certain new and useful Improvements in Resistance Devices and Welding Wires, of which the following is a specification.

This invention relates particularly to the making of a good electrical and mechanical connection between wires, or conductors, and especially in resistance devices which are covered and insulated by a coating of insulating material such as vitreous enamel.

In making resistance devices such as resistance tubes in which the resistor is wound upon the outside of a tube of insulating material, such as a porcelain tube and then covered with an insulating coating, it is a matter of considerable difficulty to form the proper joint between the lead wires and the resistive conductor, so as to insure a good electrical connection which will be permanent and form a joint which will not protrude and permit it to be thoroughly and evenly covered and protected by an insulating coating. This is especially the case where the resistor is of comparatively large diameter wire, or where made up of strands forming a braided resistor.

In accordance with my invention I weld the wires at the joint by the application of a welding current by means of electrodes placed on opposite sides of the joint, which electrodes apply sufficient pressure and simultaneously pass current through the joint for making the weld. If it be attempted, however, to make this welded joint by application of the electrodes directly to the wires or conductors, an unsatisfactory result is obtained because the joined wires do not offer sufficient resistance or one sufficiently uniform. In accordance with my invention however, I introduce a covering over the joint of auxiliary high resistance material such as an iron clip bent to embrace opposite sides of the joint. This not only gives sufficient resistance to produce a welding heat but clamps the joint together so as to permit convenient making of the weld and insures uniformity in operation and in the results obtained both from the electrical and mechanical standpoints. It also gives a flat joint that can be closely placed against the insulating support of the parts, so that when the insulating coating or enamel is applied, the joint is evenly and thoroughly covered.

Figure 1:
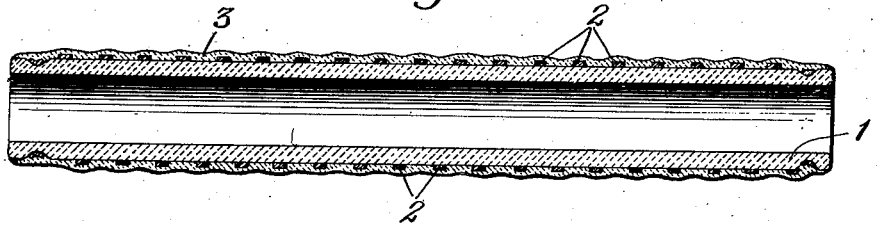
Figure 2:
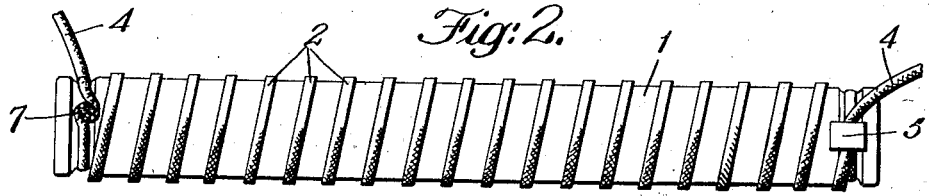
Figure 3:
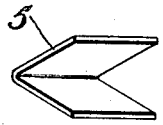
Figure 4:
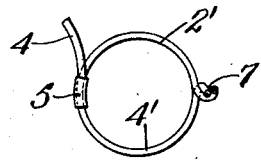
Figure 5:
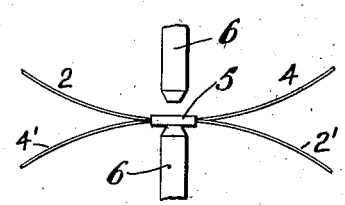

My invention will be more fully understood from the following description and accompanying drawings, in which Fig. 1 is a longitudinal section of a resistance unit embodying my invention in one form thereof; Fig. 2 is a side view of the unit before the application of the insulating coating; Fig. 3 is a perspective view of a clip applied in forming the joint; Fig. 4 is an end view of the connection at the end of the tube; Fig. 5 is a side view showing the method of applying the electrodes to the joint to form the weld, and Fig. 6 is a side view of another unit embodying my invention, before the insulating coating is applied.

In this particular instance the porcelain tube 1 is shown having the resistive conductor 2 wound thereon and covered by an insulating coating 3, which is preferably of vitreous enamel. In this case the resistive conductor is shown as a braided conductor and may be German silver wire or any other suitable material. The resistance unit has exterior leads 4 preferably of braided copper wire and the joint between these leads and the resistive conductor must form a good electrical connection and be durable and should be covered and protected by the insulating coating. This joint may be welded before the resistor is applied to its support. The lead 4 and resistor are placed in contact with each other at the point where the joint is to be made and preferably twisted together at the joint. A piece of sheet iron 5 is bent as shown in Fig. 3 and placed so as to embrace the wires where the joint is to be formed as shown in Fig. 5. The parts are then placed between the electrodes 6 of an electric welder as shown in Fig. 5 and the electrodes are then brought into engagement with the faces of the clip 5 with suitable pressure, the passage of the current causing the wires at the joint and the clip 5 to be welded together, the resistance of the parts to be welded being sufficient to cause a welding heat upon the passage of current. This results in a joint having excellent electrical connection between the lead and the resistor and also gives a joint which is thin, so that when it is applied to the support of the unit, there are no projecting parts and is adapted to be thoroughly and evenly covered with the insulating coating. The auxiliary element 5 may be of other metal than iron, but iron has been found very desirable because its resistance rapidly multiplies as it becomes heated; and even though its specific resistance may not be high compared to that of the resistance conductor before heating, its increasing resistance with the temperature due to passage of the current, causes the iron to attain a sufficiently high resistance and sufficient heating of the joint to produce a desirable weld.

Fig. 4 shows the method of securing the parts at the end of the tube. The lead 4 passes through the joint and has a portion 4'. The resistor 2 has another portion 2' extending beyond the joint. These extending portions are placed in the groove at the end of the tube and the ends twisted together as indicated at 7 to hold the parts in place. After one end of the resistor is secured, it is then wound upon the tube and then the other end is similarly secured in the groove at the opposite end of the tube the length of the resistor between the points where the joints are made, having been made such as to give the resistance required.

Figure 6:
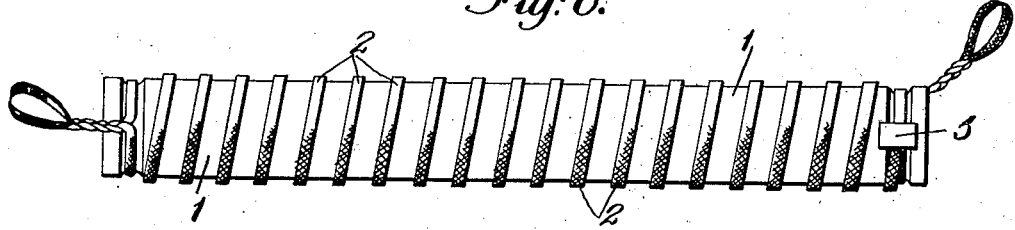

In Fig. 6, a similar unit is shown, but in this case instead of providing a lead of different material from that of the resistor, the resistor is continued to form the lead. Here the end of the resistor is placed at an intermediate portion of the resistor where the joint is to be formed and the wires preferably twisted together at that point and then the clip 5 is caused to embrace the joint and the parts then welded as already described. The loop remaining at the end of the resistor is then carried around the groove at the end of the tube and the remaining part of the loop twisted to tighten the parts as shown in Fig. 6 and firmly hold the parts at the end of the tube. This leaves a small loop in the lead for connection in circuit as desired. It will be seen that in this lead the conductor is doubled giving lower external resistance, and less heating in the lead than would be the case if the resistor formed the lead of a single conductor.

Although I have described one method of forming the welded joint and one form of resistance device, it will be understood that my invention is capable of various applications embodied in various other forms of devices, and the joint may be made in other ways than the particular form shown and described without departing from the scope of my invention.

I claim:—

1. A resistance device comprising a support, a resistor, a welded joint between said resistor and an external lead, and an insulating coating covering said resistor, joint and support, said joint comprising an auxiliary welded piece of high resistance metal.

2. A resistance device comprising a support, a resistor, a welded joint between said resistor and an external lead, and an insulating coating covering said resistor, joint and support, said joint comprising an auxiliary welded piece of high resistance sheet metal embracing opposite sides of the joint.

ALFRED ERNEST WALLER.